3,321,453
MODIFYING POLYMERS
David S. Breslow, Wilmington, Del., assignor to Hercules Incorporated, a corporation of Delaware
No Drawing. Filed Mar. 24, 1964, Ser. No. 354,427
6 Claims. (Cl. 260—88.2)

This invention relates to modifying polymers and to the products so produced. More particularly, the invention relates to modifying ethylene polymers with azidotriazines and to the products so produced.

In the past the rubber industry has depended almost entirely on sulfur, sulfur-bearing materials, and peroxides as vulcanizing, i.e., cross-linking agents. These agents are not, however, effective in covulcanizing blends of ethylene polymers with other polymers. It has more recently been reported that certain types of azo compounds are capable of acting as vulcanizing agents. However, these prior art compounds possess a relatively low temperature of decomposition and may tend to scorch.

Now, in accorance with this invention it has been found that ethylene polymers can be cross-linked by heating in the presence of an azidotriazine having the formula

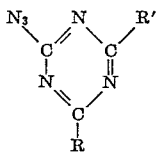

where R is hydrogen, an azide or an organic radical inert to cross-linking reactions, and R' is hydrogen or an organic radical inert to cross-linking reactions, to give vulcanizates that are tough, resilient, solvent resistant, and color free. In addition, ethylene polymers can be treated with smaller amounts of azidotriazine to improve their properties without materially affecting their solubility.

Any azidotriazine, including mono- and di-azido-s-triazines, as defined above, can be used in the process of this invention. Most preferably, and for most applications, the inert organic radicals on the triazine will be alkyl, aryl, amino, alkylamino, dialkylamino, arylamino, diarylamino, aryl-alkylamino, alkoxy, aryloxy, acyloxy, alkylthio or arylthio. Exemplary of the most preferred azidotriazines are 2-dodecylamino-4,6-diazido-s-triazine, 2,4-dipiperidino-6-azido-s-triazine, 2-dicyclohexylamino-4,6-diazido-s-triazine, 2-anilino-4,6-diazido-triazine, 2-diphenylamino - 4,6 - diazido - 2 - triazine, 2 - N - methylanilino - 4,6 - diazido - s - triazine, 2 - ethyl - 4,6 - diazido-s-triazine, 2-phenyl-4,6-diazido-s-triazine, 2-ethoxy-4,6-diazido-s-triazine, 2-phenoxy-4,6-diazido-s-triazine, 2-thiophenoxy-4,6-diazido-s-triazine, 2-acetoxy-4,6-diazido-s-triazine, etc.

Any polymer, homopolymer, copolymer, terpolymer, etc., containing at least about 30 mole percent of ethylene can be modified by the process of this invention. Exemplary of these polymers are low and high density polyethylene, ethylene-propylene copolymers, ethylene-butylene copolymers, ethylene-vinyl acetate copolymers, ethylene-propylene-diene terpolymers such as ethylene-propylene - butadiene terpolymers, ethylene - propylene - isoprene terpolymers, etc. (containing no more than about 10 mole percent of the diene). In addition, any one of these polymers can be blended with another polymer and covulcanized.

The modification process of this invention can be carried out by heating the ethylene polymer in the presence of the azidotriazine to a temperature at which the azide decomposes. This temperature varies over a wide range, but in general will be from about 150° C. to about 250° C. Various amounts of the azidotriazine can be added, the optimum amount depending on the amount of cross-linking or other modification desired, the specific azidotriazine employed, etc. In general, the amount added, based on the weight of the ethylene polymer, will be from about 0.001% to about 30%, and most preferably, from about 0.1% to about 30%. In some cases, it may be desirable to add a small amount, i.e., from about 0.01% to about 1.0%, of sulfur which seems to act as a co-agent for the azidotriazine.

The azidotriazine can be incorporated with the ethylene polymer in any desired fashion; for example, it can be uniformly blended by simply milling on a conventional rubber mill or dissolved in a solution containing the polymer. By either means, the azidotriazine is distributed throughout the polymer and uniform cross-linking or other modification is effected when the blend is subjected to heat. Other methods of mixing the azidotriazine with the polymer will be apparent to those skilled in the art.

In addition to the azidotriazine, other ingredients can also be incorporated. The additives commonly used in rubber vulcanizates can be used here also, as for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which an additive is not required or desired and excellent results are achieved when only the azidotriazine is added.

The following examples are presented for purposes of illustration, parts and percentages being by weight unless otherwise specified. The molecular weight of the polymers modified in these examples is indicated by the Reduced Specific Viscosity (RSV) given for each. By the term "Reduced Specific Viscosity" is meant the $\eta sp./C.$ determined on a 0.1% solution (0.1 g. of the polymer per 100 ml. of solution) of the polymer in decahydronaphthalene at a temperature of 135° C.

The extent of cross-linking is determined by analysis for percent gain in insolubility in solvents in which the uncross-linked polymer is soluble, hereinafter termed "percent gel."

Percent gel is determined as follows: A weighed sample of polymer is soaked in a solvent at an elevated temperature. The sample is then removed and dried to constant weight. The weights of initial and final sample are corrected for polymer and copolymer content based on knowledge of components. From these figures $$\frac{\text{corrected dry weight}}{\text{corrected initial weight}} \times 100 = \text{percent gel.}$$

Example 1

An azidotriazine was prepared as follows: 2-dodecylamino-4,6-dichloro-s-triazine, dissolved in a mixture of acetone and dimethylformamide, was treated with sodium azide to give a good yield of 99% pure 2-dodecylamino-4,6-diazo-s-triazine.

To 300 parts of toluene was added 10 parts of an ethylene-propylene copolymer containing approximately 68 mole percent of ethylene and having an RSV of 2.9. To the resulting solution was added 0.5 part of the 2-dodecylamino-4,6-diazido-s-triazine and the solvent allowed to evaporate under vacuum. The polymer was then cured by heating in a closed steel mold for 1 hour at a temperature of 200 to 205° C. The resulting vulcanizate was a strong, resilient rubber having a percent gel of 94 as determined in toluene at 80° C. The cross-linking process produced essentially no discoloration. A control sample containing no azidotriazine was prepared by the same method and was completely soluble in toluene at 80° C.

Example 2

To 830 parts of chloroform was added 25 parts of the ethylene-propylene copolymer described in Example 1. To the resulting solution was added 2.5 parts of 2,4-dipiperidino-6-azido-s-triazine and the solvent allowed to evaporate overnight at room temperature. The polymer was then cured by heating under an atmosphere of nitrogen for 90 minutes at a temperature of 211° C. The resulting vulcanizate had a percent gel of 57 as determined in toluene at 80° C. A control treated in the same way except for the addition of azidotriazine was completely soluble in toluene at 80° C.

Example 3

A sample of the ethylene-propylene copolymer described in Example 1 was cross-linked with 2-dicyclohexylamino-4,6-diazido-s-triazine exactly as described in Example 1. The resulting vulcanizate was a strong, tough rubber having a percent gel of 94 as determined in toluene at 80° C.

Example 4

To 100 parts of a high-density polyethylene having an RSV of 2.8 was added 2 parts of 2-dicyclohexylamino-4,6-diazido-s-triazine dissolved in 250 parts of acetone. The resulting slurry was evaporated to dryness in vacuo and then cured by heating in a steel press for 12 minutes at a temperature of 215° C. under a pressure of 800 p.s.i. The resulting vulcanizate had a percent gel of 76 as determined in decahydronaphthalene at 140° C. A control sample of the polyethylene treated in the same way except for the addition of triazine was completely soluble in decahydronaphthalene at 140° C.

What I claim and desire to protect by Letters Patent is:

1. A polymer contaning at least about 30 mole percent of ethylene modified with an azidotriazine having the formula

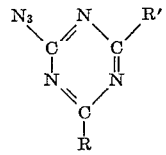

where R is a radical selected from the group consisting of hydrogen, azide and inert organic radicals, and R' is a radical selected from the group consisting of hydrogen and inert organic radicals.

2. The product of claim 1 wherein the azidotriazine is 2-dodecylamino-4,6-diazido-s-triazine.

3. The product of claim 1 wherein the azidotriazine is 2,4-dipiperidino-6-azido-s-triazine.

4. The product of claim 1 wherein the azidotriazine is 2-dicyclohexylamino-4,6-diazido-s-triazine.

5. The product of claim 1 wherein the polymer is polyethylene.

6. The product of claim 1 wherein the polymer is an ethylene-propylene copolymer containing at least about 30 mole percent of ethylene.

No references cited.

JOSEPH L. SCHOFER, *Primary Examiner.*

L. EDELMAN, *Assistant Examiner.*